Sept. 10, 1968
E. H. LYONS, JR
3,401,062
PROCESS AND APPARATUS FOR ELECTROLYTIC PRODUCTION OF ELECTRIC
CURRENT FROM PHOTOREDUCIBLE METAL OXIDES
Filed May 14, 1962
2 Sheets-Sheet 1
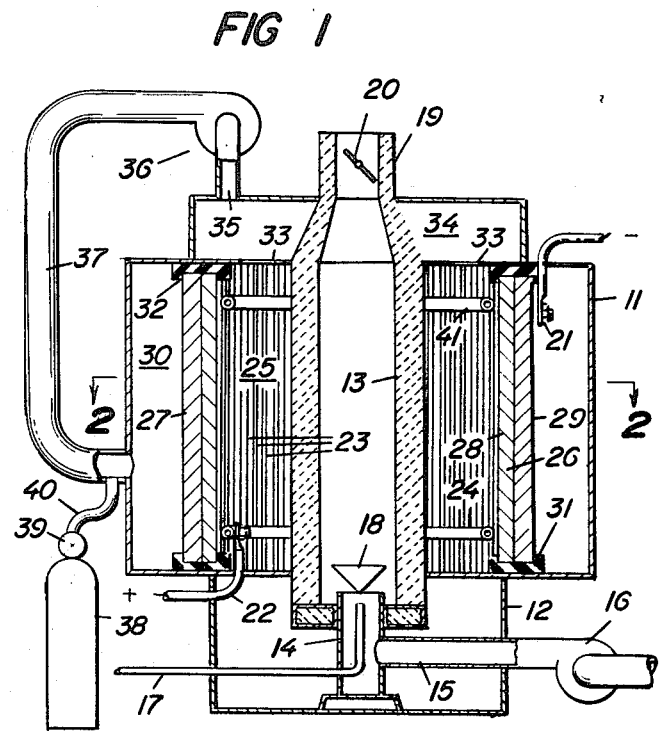
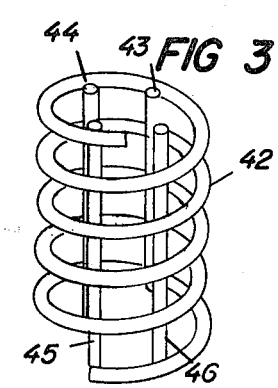
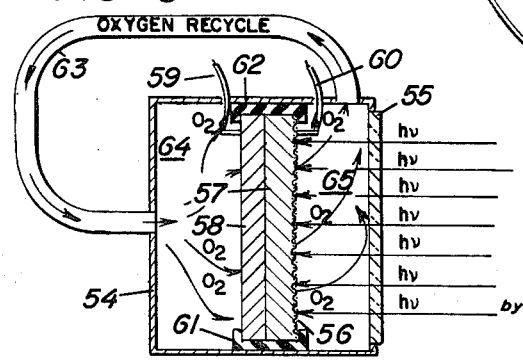
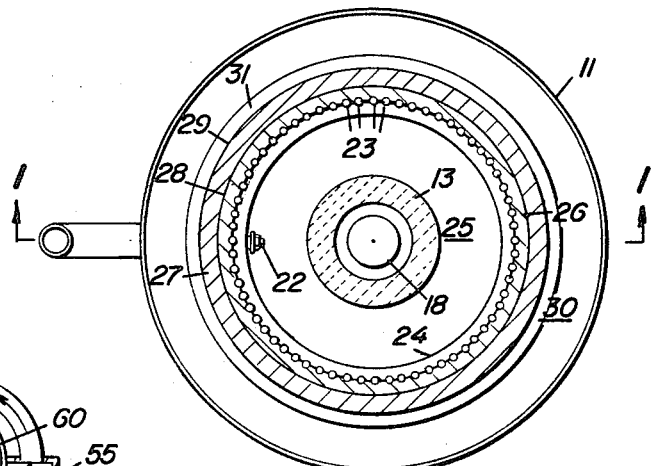
Inventor
Ernest H. Lyons, Jr.
by Robert N. Priddy
his Agent

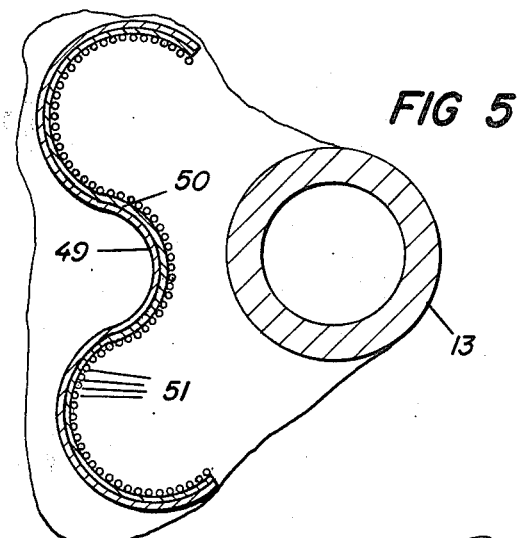
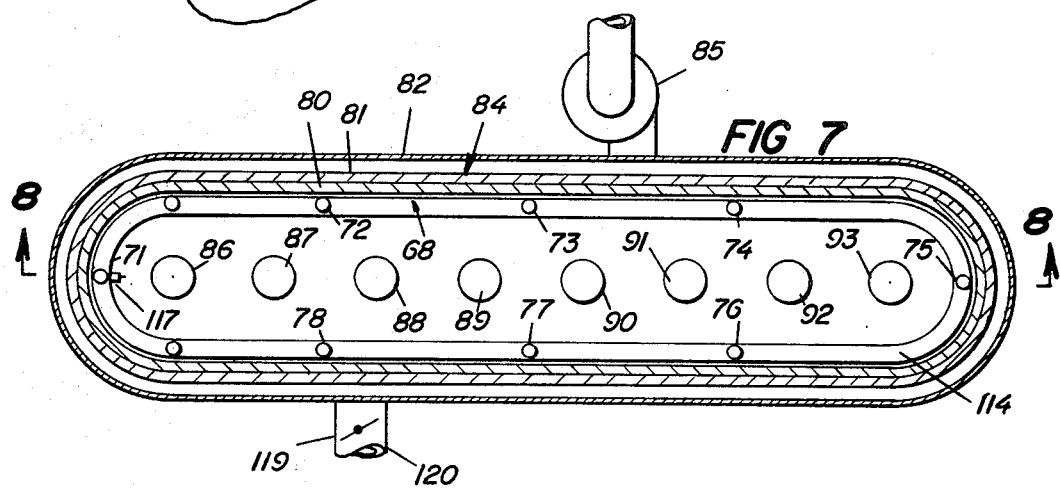
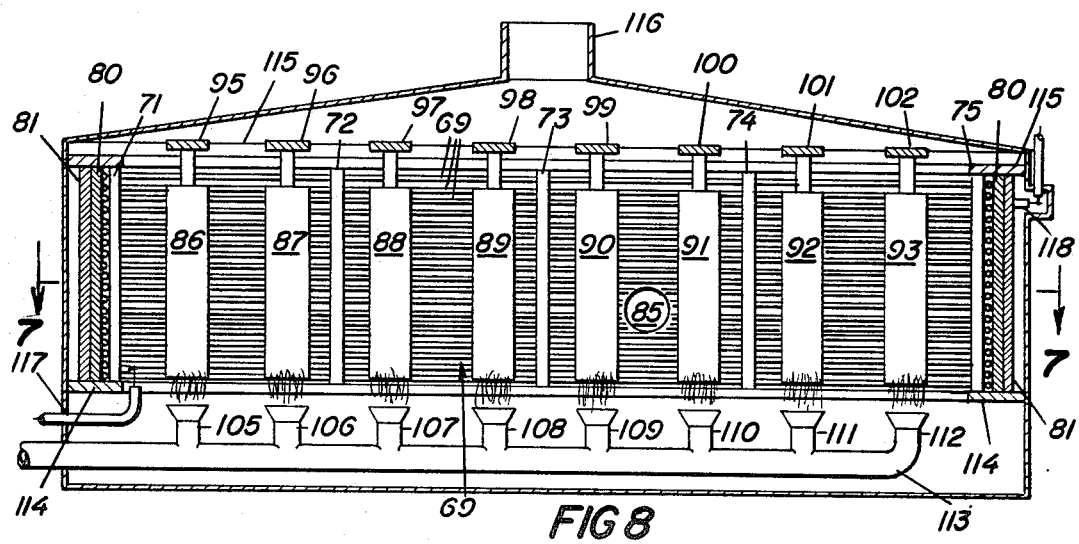

United States Patent Office 3,401,062
Patented Sept. 10, 1968

3,401,062
PROCESS AND APPARATUS FOR ELECTROLYTIC PRODUCTION OF ELECTRIC CURRENT FROM PHOTOREDUCIBLE METAL OXIDES
Ernest H. Lyons, Jr., P.O. Box 37, Elsah, Ill. 62028
Continuation-in-part of application Ser. No. 187,611, Apr. 16, 1962. This application May 14, 1962, Ser. No. 194,227
14 Claims. (Cl. 136—86)

This is a continuation-in-part of application Ser. No. 187,611 filed Apr. 16, 1962, now abandoned which is a division of application Ser. No. 840,196 filed Sept. 15, 1959, now United States Patent No. 3,100,163.

This invention relates to electrolytic energy conversion apparatus and more particularly to an indirect fuel cell which may be continuously regenerated with the aid of light energy while the cell is in service without the necessity of physically removing any electrolytic materials from the cell.

In his co-pending applications, S.N. 187,611 filed Apr. 16, 1962, now abandoned and S.N. 840,196 filed Sept. 15, 1959, now United States Patent No. 3,100,163, of which the former case is a division, the present inventor has described a Photochemical Electrical Cycle. In one aspect, that invention relates to a process wherein certain higher metal oxides are photochemically reduced by solar energy to lower metal oxides, which, in turn, then are put into an electric cell and re-oxidized with an output of electric current. The aforementioned applications disclose that the re-oxidized lower metal oxides may then be reduced by solar energy outside of the cell.

The inventor has now discovered that photoreduction may be accomplished without removal of the lower metal oxide from the cell. Thus, the art is now provided with an alternate mode of photoreduction which will prove useful under some circumstances where the removal of material from the cell might not be desirable.

The inventor has now also discovered a type of apparatus which will permit photoreduction not only by means of solar energy, but also by means of energy from an artifical source of radiant energy. Thus, the operation of the process and apparatus are liberated from the need for sunlight.

The apparatus of the present invention has attributes which make it eminently suitable for use in the construction of cells and power packs for domestic use and for space vehicle and other mobile applications. Therefore, it is an object of this invention to provide a novel photoregenerative cell suitable for use in the construction of small, sealed power units which might conveniently be useful as automotive, space vehicle or domestic power supplies.

Still another object of this invention is to provide a photoregenerative cell incorporating an electrolyte and an oxygen cathode and having a fenestrate anode for passing photon energy from a source of light energy to the anode-electrolyte interface in order to reduce a photoreducible metallic oxide formed on the surface of said anode during its use.

A further object of this invention is to provide a photoregenerative cell utilizing a photoreducible anode, and an oxygen cathode, said cell having means to recycle oxygen released at the anode to the oxygen input of the cathode for rendering said cell completely self-contained with respect to its oxygen supply.

Other objects and advantages of the invention will suggest themselves to one skilled in the art when the following disclosure is considered in connection with the accompanying drawings.

The inventor has discovered that the above objects and advantages are obtained with the aid of a photoregenerative cell which may be broadly characterized as follows. The cell includes an anode, in most cases a fenestrate anode. By "fenestrate" the inventor wishes to specify an anode which contains windows or openings, through which radiation directed towards the anode may pass through the anode to an interface between the anode and an electrolyte. No particular significance is attached to the shape of these openings or windows. Thus, it is possible, as will be shown, for the windows or openings to have a shape which is circular, rectangular, square, non-descript or any other shape or configuration which will accomplish the intended purpose.

The anode includes a metallic oxide which, when oxidized, is converted to a metallic oxide which is photochemically reducible. For the sake of providing a single term by which to refer to those lower metal oxides which can be converted to a photoreducible metal oxide by oxidation, I have designated the term "lower form of the photoreducible metal oxide." A photochemically reducible or photoreducible metal oxide is an oxygen-containing compound of a metal which can be reduced to a lower oxide at a rate which is positively influenced by its irradiation with photon energy. Thus, a photochemical reduction reaction or photoreduction is a reaction in which the rate of reduction of the photoreducible metal oxide to its lower form is increased with the aid of photon energy by irradiating the photoreducible oxide while reduction is taking place. According to present knowledge, copper oxides are the preferred photochemically reducible metal oxides. However, it has been found that oxides of iron, cobalt, lead, manganese, silver and other metals are useful.

The photoreducible metal oxides just referred to will have absorption maxima in the visible or infra-red portions of the radiation spectrum, that is in the region of wave lengths which ranges from $1 \times 10^{-2}$ cm. to $4 \times 10^{-5}$ cm. While there is nothing about ultraviolet radiation which can be said to make it inoperative in the invention, all the metal oxides presently known to operate as photochemically reducible metal oxides have absorption maxima in the visible or infra-red spectra.

The cell also includes an electrolyte. In its broader aspects the invention comprehends the use of any electrolyte material which, under cell operating conditions, would contain ions produced by reaction with oxygen at the cathode and capable of reacting with the lower form of a photochemically reducible metal oxide at the anode to produce electric current. Therefore, a wide range of choice may be exercised in the selection of the electrolyte. For instance, the electrolyte may be a solid, a liquid, a liquid absorbed upon a perforate solid matrix, a jelled-liquid or have any other suitable physical form. The chemical constituency of the electrolyte, as will be shown, may include for instance: a mixture of alkali carbonates contained in the capillary pores of a ceramic matrix; solid solutions and solid-state reaction products of selected, mixed conductive oxides, such as $ZrO_2$—$MgO$, $ZrO_2$—$CaO$, $HfO_2$—$CaO$, $ZrO_2$—$Y_2O_3$, $ZrO_2$—$La_2O_3$ and similar systems; an aqueous caustic electrolyte solution which has been jelled by adding to it one or more of the following: carboxymethyl cellulose in very weak alkaline solution, guar gum, synthetic resin of various types, calcium stearate or other soaps, or a hydrous oxide such as $Fe(OH)_3$, $Sc(OH)_3$, $Y(OH)_3$, $La(OH)_3$ or other lanthanides; an ion exchange membrane, such as is described, for example, in the proceedings of the 14th Annual Power Sources Conference of the Power Sources Division of the U.S. Army Signal Research and Development Laboratory, Fort Monmouth, New Jersey; a water solution of perhaps 5–60% NaOH or KOH absorbed on a matrix composed of a major amount of MgO and minor amounts of one or more additives such as $Al_2O_3$, $SiO_2$, other refractories, CaO and BaO; and others.

When choosing a solid electrolyte, the oxide ion transference number is a factor to be considered. Facts presently available indicate that excellent results are obtained from solid electrolytes having an oxide ion transference number of at least about 0.95. The term oxide ion transference number, as employed herein, refers to a numerical scale of decimal fractions between zero and one which reflect the fraction of the total conductivity of an electrolyte which is attributable to charge transfer via oxygen ions and other ions capable of reacting with the lower form of a photoreducible metal oxide at the anode to produce the photoreducible metal oxide, as opposed to transfer by other anions, cations, electrons, or electron holes.

A different situation is presented when liquid rather than solid electrolytes are used. The transference number of an electrolyte-containing species such as $CO_3^=$ or $OH^-$ may lie between 0.10 and 1.00. The concentrations of other ions taking part in the conduction will be equalized by diffusion, which does not take place in solid electrolytes.

The electrolyte intimately contacts the surface of the anode. The anode is preferably embedded in the electrolyte, if it is a solid electrolyte, so that the electrolyte material actually enters the windows or openings. The object of the intimate contact is achieving conductivity. Therefore, any mode of association between the anode surface and the electrolyte which achieves an adequate degree of conductivity therebetween for efficient operation of the cell is sufficient for purposes of the invention.

Also in intimate contact with the electrolyte is an oxygen cathode. The function of the cathode is to adsorb oxygen, ionize it and transfer it to the electrolyte. Any material suitable for carrying out these functions will suffice. For example, experimentation has shown that lithium-doped transition metal oxides, porous or sintered platinum, silver powder, nickel oxide doped with lithium, palladium and carbon impregnated with catalysts are just a few of the suitable materials for the cathode. The cathode may assume various physical forms; however, it must ordinarily be porous so that the necessary adsorption and ionization can take place.

Furthermore, the cell will ordinarily include electrical conductors for connecting the anode and cathode to a resistive load device. The connection may be direct, as when a single cell is employed to operate the load device, or it may be indirect. An example of indirect connection would be where a number of cells in series relationship are used to operate the load device. In that case the connection between the anode and cathode in a given cell is a flow path which includes other cells as well as the load device.

The invention will ordinarily include means for introducing oxygen to the cathode. This term is intended to bring to mind a broad range of structural alternatives of uniform function, namely to convey oxygen gas to the cathode where it may be ionized. A simple example of such means is found in one of the embodiments described herein. In that instance the means for introducing oxygen to the cathode includes: a first chamber enclosing the anode to trap oxygen released therefrom by reduction of the anode; an oxygen conduit communicating with the first chamber; and a second chamber enclosing the cathode, the second chamber also being in communication with the same conduit so that oxygen released from the anode may freely recycle back to the cathode. The result is a closed oxygen system. In another embodiment of the invention there is a closed oxygen system similar to the above, but it is provided with a blower to augment the natural tendency for the oxygen to recycle itself. The fact that the cathodes mentioned above will reject all of the common gases of the air except oxygen makes it possible to adopt still another embodiment. In this embodiment of the invention, the cathode is enclosed by a chamber, the chamber being connected to a blower which forces air into the chamber, so that the oxygen of the air will be adsorbed on the cathode. The oxygen released from the anode is allowed to escape to the atmosphere. However, the oxygen need not be wasted. It could be recycled or conserved for use in other operations. It is readily apparent that many other alternative forms for the means for introducing oxygen to the cathode will readily suggest themselves to one skilled in the art.

The source of radiant energy utilized in the operation of the method and apparatus of the present invention may be natural sunlight or a concentrated artificial source. Radiant energy from the natural or the artificial source impinges upon the anode-electrolyte interface where it causes or expedites the reduction of the photoreducible oxide. The exact type of source employed depends upon the particular conditions of use to be encountered, as well as the character of the light absorption curve of the photoreducible oxide.

Each combination of electrodes and electrolyte has a characteristic operating temperature or range of temperatures which results in optimum efficiency. In most applications of the invention, where heating is required, the source of radiant energy will provide, as an incident of its light-energy producing function, sufficient heat to maintain the cell at its proper operating temperature. Under operating conditions which render the heat of the source insufficient for this purpose, an auxiliary source of heat is employed. The auxiliary source can be any one of a large number of types which produce heat by combustion, chemical reaction, nuclear reaction, concentration of the rays of sunlight and other means.

The operation of the invention, reduced to its simplest terms, begins when the cathode passes oxygen ions to the electrolyte. The current-carrying species of the electrolyte reacts with metal or metal oxide on the anode to produce the photochemically reducible oxide and to produce a surplus of electrons which flow out of the cell into the external circuit through the electrical conductors associated with the anode and cathode. The source of photon energy, which may incidentally be used to maintain the cell at an elevated operating temperature, irradiates the anode while the cell is operating. The radiation passes through the fenestrate anode where it causes or aids in the photochemical reduction of the photochemically reducible oxide produced in the course of the current producing reaction. Both the photochemical reduction and the current producing reaction take place simultaneously in the same cell. Therefore the cell is able to produce current continuously, without periodic removal of the anode material for regeneration. Thus, the cell will operate on a continuous basis as long as the source of photon energy continues to irradiate the anode and the cathode is well supplied with oxygen.

Oxygen is released at the anode by the photochemical reduction reaction. This oxygen may be wasted or conserved. If it is conserved, it may be recycled through the means for introducing oxygen to the cathode. Since the competing reactions in the cell must reach a steady state under stable conditions, the anode should release the stoichiometric equivalent of the oxygen ions it consumes once stable operating conditions have been attained. Thus, a closed system is possible in which the only thing which is supplied to the cell during its operation is the radiant energy from the photon source.

The novel process disclosed herein comprises the steps of ionizing oxygen to produce oxygen ions; passing the oxygen ions to an electrolyte capable of transferring an ionic oxidizer from said electrolyte into a body of material which includes a lower form of a photoreducible metal oxide; reacting upon said lower form with said ionic oxidizer to produce a surplus of electrons and said photoreducible metal oxide; causing the surplus of electrons to flow into an external load circuit; and irradiating the photoreducible metal oxide in the cell with light from a source of radiant energy.

The term ionic oxidizer comprehends any ionic species susceptible to oxidative reaction with the lower form of the photoreducible metal oxide. The ionic species may be oxygen ions, as in the case of a solid oxide electrolyte. In such a situation, the electrode reactions of the cell will be as follows, using copper oxides as an example of the photoreducible metal oxide and the lower form thereof:

$$\text{Anode: } Cu_2O + O^= \rightarrow 2CuO + 2E^- \quad (1)$$

$$\text{Cathode: } \tfrac{1}{2}O_2 + 2E^- \rightarrow O^= \quad (2)$$

With a carbonate electrolyte, which, incidentally, requires $CO_2$ in the oxygen supply, the reactions will be as follows:

$$\text{Anode: } Cu_2O + CO_3^= \rightarrow 2CuO_2 + 2E^- \quad (3)$$

$$\text{Cathode: } \tfrac{1}{2}O_2 + CO_2 + 2E^- \rightarrow CO_3^= \quad (4)$$

With an aqueous alkaline electrolyte, the electrode reactions will be:

$$\text{Anode: } Cu_2O + 2OH^- \rightarrow 2CuO + H_2O + 2E^- \quad (5)$$

$$\text{Cathode: } \tfrac{1}{2}O_2 + H_2O + 2E^- \rightarrow 2OH^- \quad (6)$$

With a fused caustic electrolyte, the electrode reactions will be the same as those for an aqueous alkaline electrolyte. Where a fused caustic electrolyte is used, $H_2O$ must be present in the oxygen supply. Oxidizers other than those specifically mentioned herein are also useful.

The inventive concepts having been described in terms calculated to demonstrate the breadth of their applicability, three exemplary embodiments and numerous possible modifications thereof will now be described in connection with the accompanying drawings so that those skilled in the art will be apprised of some of the modes of putting the inventive concepts to practical use, including the mode presently regarded by the inventor as the best mode.

In the drawings, in which sectional views are taken in the directions and at the locations indicated by section lines corresponding numerically to the various figure numbers, and in which like part numbers refer to like parts throughout the figures:

FIGURE 1 is a sectional view taken on section lines 1—1 in FIGURE 2;

FIGURE 2 is a sectional view taken along section lines 2—2 in FIGURE 1;

FIGURE 3 is a perspective detail view of an alternative anode structure for the cell;

FIGURE 4 is a side elevation of a second alternative anode structure for the cell;

FIGURE 5 is a fragmentary, sectional detail view of a third alternative anode structure for a cell modeled, in part, after the cell shown in FIGURES 1 and 2;

FIGURE 6 is a sectional view of a second embodiment of the invention;

FIGURE 7 is a sectional view of a third embodiment of the invention taken along section lines 7—7 in FIGURE 8;

FIGURE 8 is a sectional view taken along section lines 8—8 in FIGURE 7.

As shown in the preferred embodiment of the invention in FIGURES 1 and 2, the cell elements are arranged in a pressure-tight cabinet 11 in the shape of a cylinder. Cabinet 11 rests upon a firebox 12 which should in turn rest upon some suitable foundation or other supporting framework which is not shown. The cell elements are concentrically arranged about the emitter 13 which itself is centered upon the axis of cabinet 11.

In this embodiment of the invention emitter 13 is made of ceramic material although mixtures of metal and ceramic material, metal alloys, or pure metal will also serve the desired purpose. The function of the emitter is to radiate photon energy to the cell elements surrounding it within the cabinet 11. In order to perform this function the emitter 13 must be heated. For that purpose, a burner 14 is provided within the firebox 12, the outlet end of said burner protruding upward into the lower end of emitter 13. Fuel and air mixture for combustion in burner 14 are provided by means of an air pipe 15, air blower 16 and gas pipe 17, all discharging into the burner 14. The blast of hot gases emanating from the burner outlet are directed against the inner walls of the emitter 13 by a conical deflector 18 stationed point down above the outlet. The flow of combustion gases out of the emitter 13 through chimney portion 19 may be controlled by a damper 20 provided therein.

In this embodiment, the fenestrate anode is also of cylindrical configuration and comprises a plurality of spaced apart metal bars 23 arranged vertically in parallel fashion about the peripheries of support rings 24 and 41. The anode bars 23 constitute a support for a thin coating of metal oxide, in this case copper oxide. The separations between the bars 23 have been provided to facilitate the passage of light energy from the emitter 13 to the anode-electrolyte interface.

A first portion of the surface of each bar 23 faces towards the emitter 13. Another, second portion, faces away from the emitter. All of the said first portions, considered in the aggregate, constitute the first surface of the anode. The space defined by said first anode surface, the exterior surface of the emitter 13 and the walls of the cabinet 11 define a chamber 25 separating the emitter 13 from the anode.

Together, the second portions of all the bars 23 constitute the second anode surface. This surface of the anode is ordinarily held in intimate contact with the electrolyte. In this embodiment, the anode bars 23 are partially embedded in the radially inward cylindrical surface of the electrolyte. It has the ability to transfer oxygen ions from the cathode, where they are produced, to the anode, where they react with the copper oxide to produce current.

In this embodiment of my invention the electrolyte 26 is a solid solution of calcium oxide and zirconium oxide. The composition includes 85 mol percent $ZrO_2$ and 15 mol percent $CaO$. This electrolyte composition will have an oxide ion transference number of 0.95 to 1.00 at 700° C.–1000° C., the operating temperature of this embodiment. That is to say that no more than 5 percent of the current is carried by cations, other anions, electrons and electron-holes for best results.

Cathode 27 is also concentric with the emitter, is generally cylindrical or annular in configuration and is in intimate contact with the electrolyte 26 about the radially outward surface thereof. The inner surface 28 of cathode 27 may be referred to as the electrolyte surface because the solid electrolyte is in intimate, electrically conductive contact with the cathode at this interface. The cathode is a dense annulus of nickel riddled with a multitude of tortuous passages. A substantial proportion of said passages intercommunicate between the outer surface 29 of the annulus and its inner, or electrolyte surface 28. An electrode of this type has the ability to adsorb oxygen, ionize it and transfer it to the solid electrolyte. The anode 23, solid electrolyte 26 and anode 27 are supported as a unit in the cabinet by insulating rings 31 and 32, which prevent the anode and cathode from shortcircuiting through the cabinet 11.

In this embodiment of the invention the means for diffusing oxygen comprises a closed oxygen system in which the source of oxygen is the cell anode 23 from which oxygen is released during the operation of the cell. The openings in the anode conduct oxygen, released from the anode by reduction of the photoreducible oxide, into the chamber 25. Holes 33 are provided in the top of chamber 25 so that the oxygen can be drawn into a manifold 34. The withdrawn oxygen in manifold 34 can then be routed through a header 35 to recirculating blower 36 which will send the oxygen under pressure through a recycle conduit 37 to the chamber 30. The chamber 30 is defined by the outer surface 29 of cathode 27 and by the walls of the cabinet 11.

The entire system is filled with oxygen or a mixture of gases which is sufficiently rich in oxygen for the cell to operate. The oxygen system is preferably gas-tight, although in most arrangements, especially where large banks of cells are united in a single oxygen system, there will be an inevitable leakage of oxygen from the system. In order to maintain the necessary quantity and pressure of oxygen, an oxygen cylinder 38 provided with regulator 39 and supply pipe 40 may be tapped into the system. The regulator 39 will operate to replenish the oxygen supply when the pressure drops below a prescribed minimum. Of course if the system were perfectly sealed, the oxygen cylinder and related components would be mere surplusage and could be discarded.

The operation of this embodiment of the invention may be explained as follows. To put the illustrated cell into operation, one would first start the blowers 16 and 36, turn on the supply of gas to gas pipe 17 and light the burner 14. After a period of time the emitter 13 will reach a condition of incandescence whereupon it will begin to emit visible and/or infra-red radiation, depending upon its temperature, outward towards the anode. Any CuO on the anode will be photochemically reduced to the lower oxide, $Cu_2O$ in accordance with the following equation:

$$2CuO + h\nu \rightarrow Cu_2O + \frac{1}{2}O_2\uparrow \qquad (7)$$

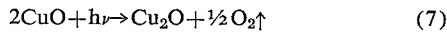

The symbol $h\nu$ signifies the photon energy which when absorbed by CuO, the higher oxide, causes it to liberate oxygen and consequently become the lower oxide, $Cu_2O$. Its presence in the above equation is for the purpose of showing that although the temperature within the cell or at least at the anode-electrolyte interface is 700–1000° C., the photon energy is at least partly responsible for the regeneration which proceeds under these conditions.

At first, most of the absorbed radiation will be converted into heat and will raise the temperature of the electrolyte and electrodes. When the temperature reaches about 800° C., the cell is ready for use. The current taps 21 and 22 should now be connected to the external circuit. When a load is placed across the cell, reactions will take place at the electrodes in accordance with Equations 1 and 2.

Net cell reaction:

$$Cu_2O + \frac{1}{2}O_2 \rightarrow 2CuO \qquad (8)$$

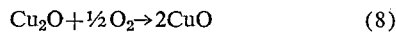

The CuO produced during generation will be constantly reduced, since the emitter 13 continues to radiate light energy to the anode-electrolyte interface through the openings in the fenestrate anode while current is being produced. The regeneration of the cell will proceed according to Equation 7. Thus the net chemical reaction of the system is zero, meaning the amount of oxygen consumed at the cathode equals the amount of oxygen liberated by regeneration at the anode. Consequently it should now be readily apparent that continuous removal of the oxygen from the chamber 25 and recirculation thereof to the chamber 30 under pressure will allow operation of the cell as a closed system insofar as its oxygen requirements are concerned. The fenestrate anode and cooperating light energy source enable the cell to operate continuously by cyclically oxidizing and reducing without physically removing the photoreducible oxide from the cell or the anode. As a result the cell can deliver a continuous flow of current to the external circuit.

It is contemplated that numerous alterations can be made in the above-described embodiment without departure from the spirit of the invention. Only a few of the many possible alterations will be illustrated herein. For instance, FIGURES 3 and 4 show alternative forms for the anode. In FIGURE 3, the supporting element is a wire spiral 42. The spiral is supported by vertical posts 43, 44, 45 and 46, attached to the inner surfaces of each loop. The spiral 42, like the vertical bars 23, is coated with a photoreducible metal oxide and is installed in the cell so that it is embedded in the electrolyte.

Another form of anode, as shown in FIGURE 4, is fabricated from a hollow, cylindrical metal blank 47. The blank is provided with a multitude of apertures 48 which penetrate its walls and conduct light from the inside of the blank to the outside and vice versa. The apertured blank, like the bars 23, is coated with a photoreducible metal oxide which lines, but does not fill the apertures 48, and covers the outer surface of the blank. When it is installed in place of the anode bars 23 shown in FIGURES 1 and 2 the radially outer surface of the blank 47 constitutes the second anode surface and it is in intimate contact with the electrolyte 26.

While FIGURES 1–4 illustrate the anode as having a generally cylindrical shape, deviations from this shape are possible and in some cases may be desirable. For instance, FIGURE 5 shows an electrode-electrolyte combination having involute walls. As in the FIGURES 1–2 embodiment of the invention, there is an emitter 13, cabinet (not shown), oxygen system (not shown) and burner system (not shown). However, the cathode 49, electrolyte 50 and anode 51 are bound together in a shape which is of fluted cross section. As a result, there is a larger area of anode exposed to the photon energy radiated from emitter 13. Many other varieties of involute anodes can readily be adapted to use herein.

While the embodiments above have shown the fenestrate anode as a regular closed figure of geometric configuration, the anode need not be a regular shape or a closed figure. One example of an anode having an over-all shape which is not a closed figure would be a woven mesh of wires embedded in one surface of a flat body of electrolyte. This point is illustrated in FIGURE 6, which discloses a second embodiment of the invention.

The FIGURE 6 embodiment is an example of how the invention may be put to use in a form which is simple, inexpensive, light in weight and expendable. An embodiment of this nature is especially useful as a power supply for satellites and space vehicles. As shown in FIGURE 6, there is an air-tight housing 54 which constitutes the cell enclosure. It is provided with a transparent wall 55 through which light energy enters the enclosure, impinges upon the anode and penetrates to the anode-electrolyte interface. Anode 56 is a woven wire mesh coated with manganese oxide, a photoreducible oxide. The mesh is partially embedded in one surface of a flat body of electrolyte 57, which contains an over-all molar ratio of 75% $ZrO_2$ to 25% MgO, wherein these two oxides are united in a solid solution having the fluorite structure, but incorporating minor and indeterminant amounts of solid state reaction products of $ZrO_2$ and MgO.

The opposite surface of electrolyte 57 is intimately associated with one surface of cathode 58. Cathode 58 is a porous layer of sintered silver powder, which functions in a manner similar to cathode 28 of FIGURES 1–2. The anode-electrolyte-cathode assembly is held in place by insulators 52 and 53. Electric conductors 59 and 60 respectively are attached to anode 56 and cathode 58 to connect them with an external circuit containing a load device (not shown).

The anode-electrolyte-cathode assembly divides the housing 54 into two chambers, an anode chamber 65 and a cathode chamber 64. Neither of these chambers has any outlet save the conduit 63 through which they are interconnected with one another. In this embodiment of the invention, the conduit 63 and the chambers 64 and 65 constitute means for introducing oxygen to the cathode 58. The aforesaid chambers and conduit contain oxygen gas.

To place this cell in operation, it is necessary only to direct the transparent wall 55 of housing 54 towards a source of light having the ability to heat the cell to its operating temperature. The reactions are similar to those given for the FIGURES 1–2 embodiment, except that the manganese oxides MnO and $Mn_3O_4$ are substituted for CuO and $Cu_2O$. Some of the oxygen present in cathode chamber 64 is adsorbed by cathode 58, ionized and passed to the electrolyte 57. Electrolyte 57 passes the ions to the anode 56 where they react upon NnO to produce the photoreducible oxide $Mn_3O_4$ and discharge a surplus of electrons into the external circuit through conductors. While generation of current is taking place, regeneration of the anode also occurs. Radiant energy (h$\nu$) enters anode chamber 65 through transparent wall 55 and penetrates the fenestrate anode 56 to the anode-electrolyte interface where it brings about reduction of $Mn_3O_4$ to NnO with the consequent release of oxygen. As more oxygen is released in chamber 65 and more oxygen is removed from chamber 64, a positive pressure differential tends to build up in chamber 65. However, the conduit 63 permits the differential to dissipate itself by a flow of oxygen from chamber 65 to chamber 64, so that the cathode 58 has a continuous supply of oxygen.

If an aqueous electrolyte is used, such as 30% KOH absorbed in a matrix of magnesium oxide or asbestos fibers, operation is possible at 10 to 40° C., although the temperature will soon rise on account of heating resulting from the passage of current and from conversion of radiant energy into heat. This temperature rise is beneficial because it decreases power losses from polarization of various kinds.

The following are the reactions for this embodiment of my invention:

Generation:
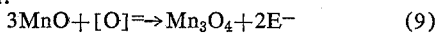
$$3MnO + [O] \rightarrow Mn_3O_4 + 2E^- \qquad (9)$$
Regeneration:
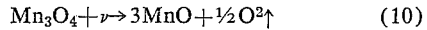
$$Mn_3O_4 + \nu \rightarrow 3MnO + \tfrac{1}{2}O^2 \uparrow \qquad (10)$$

It will be observed that FIGURE 6 and the above description describe a systematically woven wire mesh anode. However, a random tangle of wire segments of equal or varying length, coated with a photoreducible oxide or a lower form thereof and embedded in the electrolyte surface will suffice. In utilizing a random tangle of wires, it is important, however, that enough continuity exist between the individual segments therein to provide good metallic conduction of electric currents.

Still another embodiment of my invention is disclosed in FIGURES 7 and 8. In this embodiment, the fenestrate anode 68 is generally oval in cross section. The necessary openings may be provided by making the oval anode of vertical bars or oval rings or an apertured oval of cast or sheet metal or a regular oval of wire mesh or an oval of random wire mesh or according to any other suitable plan of organization which will produce an anode which functions in a manner similar to that described in connection with FIGURES 1–5. Specifically, however, in this embodiment, the anode is constructed of "stacked" oval rings or discrete wire loops 69, bonded to vertical supports 71, 72, 73, 74, 75, 76, 77 and 78. Each of the loops 69 is spaced apart from its neighboring loops and is coated with iron oxide.

The electrolyte 80 corresponds in shape to the oval rings 69 which are embedded in its inner surface. Electrolyte 80 is a fused solid solution of $HfO_2$–CaO in which the $HfO_2$ constitutes 25% mole percent of the total mixture and in which the flourite structure predominates.

Cathode 81 is a wire gauze coated with lithium-doped nickel oxide. The gauze itself is nickel metal in this example, but any other metal or non-metallic material capable of surviving cell operating conditions without disintegrating or shedding the doped nickel oxide coating will suffice. The anode 69, electrolyte 80 and cathode 81 are held together as an intimately associated electrically conductive assembly. They are maintained in spaced apart relation with respect to the wall of cabinet 82 by upper and lower oval plates 115 and 114, respectively. The oval plates are secured to the cabinet walls all the way around their peripheries and are bound into a rigid assembly with the anode, electrolyte and cathode by the vertical supports 71–78 which also support the anode rings 69. Since the oval plates 114 and 115 are made of non-conductive material such as porcelain, there is no danger of a short circuiting of the cell through said plates. The cell is connected to an external circuit by current taps 117 and 118 which are connected to the anode and cathode respectively, and which pass out of the cell through suitable air-tight openings in the cabinet 82.

Cabinet 82, oval plates 114 and 115 and the cathode 81 define a gas-tight chamber 84. Save for the pores in the cathode, chamber 84 has only two openings. One opening is for the output of blower 85 which is adapted to draw air from the atmosphere and force it into chamber 84. Blower 85 and chamber 84 constitute the means for introducing oxygen to the cathode. The oxygen needed for proper operation of the cathode is obtained from the air pumped into the chamber 84 by blower 85. The other opening in the chamber is an outlet 119 and damper 120 for venting oxygen-depleted air from chamber 84.

Because of the ready availability of atmospheric oxygen in those environments wherein this embodiment is likely to be practiced, there is no need to recycle the oxygen released by the anode. This difference makes practical a somewhat different type of emitter and means for heating the same, than was utilized in the FIGURES 1–2 embodiment. In the present embodiment, there are a plurality of emitters, 86, 87, 88, 89, 90, 91, 92, 93, each of which is made of "cer-met," a combination of ceramic and metallic materials which emit both visible and infra-red radiation when heated to incandescence. The emitters 86–93 are suspended within the cabinet 82 from transverse hangers 95, 96, 97, 98, 99, 100, 101 and 102. The hangers 95–102 suspend the emitters in a vertical attitude above the mouths of burners 105–112 and within the envelope 117 having as its boundaries: the plane of plate 114; the plane of plate 115; and the inner surface of anode 69. By locating the emitters thusly, it is possible at the same time to heat them wtih the burners 105–112 and to use them for irradiating the anode loops 69 having the photoreducible metal oxide thereon. Through a conduit 113, the burners 105–112 may be supplied with fuel with which to heat the emitters. The above-defined envelope also constitutes a passageway whereby cell and combustion products may pass upwards to the chimney 116 from which they are exhausted to the atmosphere, or are subjected to a heat exchange treatment to recover heat which would otherwise be wasted.

In order to put this embodiment of the invention into operation, one should first start sending fuel through the main supply conduit 113 to burners 105–112 and light them. When the emitters have reached a condition of incandescence, blower 85 is started. It forces air into chamber 84. Cathode 81 will reject all the plentiful air gases, except oxygen, which is adsorbed and ionized. The effect of the other gases is to cut down the electrode potential by lowering the partial pressure of oxygen. They also present the problem of maintaining a sufficient concentration of oxygen at the cathode surface. The concentration problem is solved by providing the outlet 119. It allows a complete change of "air" in the chamber 84 periodically. How frequently the air must be changed depends to a large extent on the size and turbulence characteristics of chamber 84. By adjusting the damper 120 until maximum voltage is obtained, a balance may be achieved between pressure in the chamber and oxygen concentration.

The oxygen ions produced by the cathode will migrate through electrolyte 80 to anode 69 and will oxidize the lower metal oxide $Fe_3O_4$ thereon to the photoreducible oxide $Fe_2O_3$. As soon as some of the ferric oxide is formed, it will be regenerated in situ to ferroso-ferric oxide by the impingement of radiant energy from the emitters.

The oxygen liberated by generation will pass out of the cell with the hot combustion gases through chimney 116. The cell reactions are, of course, similar to those in the prior embodiments:

Generation:
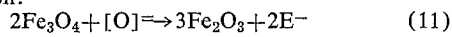
$$2Fe_3O_4 + [O] \rightarrow 3Fe_2O_3 + 2E^- \qquad (11)$$

Regeneration:
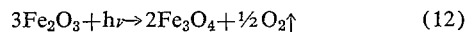
$$3Fe_2O_3 + h\nu \rightarrow 2Fe_3O_4 + \tfrac{1}{2}O_2\uparrow \qquad (12)$$

It is essential, of course, that the solid electrolyte be heated to 700–800° C. by the emitted radiant energy, so that it becomes sufficiently conductive to permit the withdrawal of substantial currents without undue potential drops.

It has been shown in the above-described embodiments how three different photoreducible oxides will function with success in three different types of cells. This should make it clear that my invention in its broadest sense is not limited to use with any particular photoreducible oxide. Indeed, besides the three oxides adverted to above, others have been mentioned herein. Still others may become available for use with my novel anode and regeneration arrangement as the art progresses.

Some additional remarks of a still more specific nature concerning the cell components are in order. While solid solutions and solid state reaction products of $ZrO_2$—$CaO$, $ZrO_2$—$MgO$ and $HfO_2$ and $CaO$ have been specifically illustrated above as suitable electrolyte materials, other conductive oxide pairs may be used, such as $ZrO_2$—$Y_2O_3$, $ZrO_2$—$La_2O_3$ and similar systems. The ratio of MgO to $ZrO_2$ in the MgO—$ZrO_2$ system may vary from 10 to 30 mol percent. The ratio of MgO to $ZrO_2$ in the $HfO_2$—$ZrO_2$ system may vary from 20 to 40 mol percent. The ratio of CaO to $ZrO_2$ in the CaO—$ZrO_2$ system may vary from about 5 to 30 mol percent.

To make the binary conductive oxide systems set forth above it is necessary only to grind up the materials together and heat them in an oven. It is not necessary to fuse them, however this is usually done. The best practice seems to be to heat the two oxides to a temperature not more than 100° C. below their fusion temperature. Fusion can be dispensed with because the grinding together of the oxides thoroughly mixes them. No special atmosphere or pressure need be used during the heating. The product will be electrically conductive and will have an oxide ion transference number between 0.95 and 1.00. According to present knowledge, systems displaying the flourite structure are preferable because they seem to allow greater oxide ion mobility. Both solid solutions and solid-state reaction products are useful.

The fenestrate anode has been demonstrated to include some sort of open support, such as an arrangement of wires, rods, or perforate metal blanks, which has been coated with a photoreducible oxide. It should be apparent that the coating does not fill up the openings in the above embodiments to the extent that the access of the regenerating radiant energy to the higher oxide at the anode-electrolyte interface is blocked. The supporting structure may be fabricated with quite a few different kinds of metal. Experimental results show that copper, platinum, nickel and silver will operate. In industrial applications of the invention cheaper metals would be preferred and are contemplated by the present invention. If the same metal is used as the support and as the metal in the photoreducible oxide, it is possible to prepare the anode simply by subjecting a copper gauze, for instance, to chemical or electrochemical oxidation until it is coated with copper oxide. However, a preferred method of applying the photoreducible oxide to the support is by flame spraying. Those skilled in the art will also recognize that similar results may be obtained by employing other techniques such as vapor deposition.

As indicated above, the cathode may be any conventional oxygen electrode. The cathode may be prepared by sinter-casting techniques. This applies equally well to silver, nickel and lithiated nickel cathodes. The doped nickel may be prepared by either of two methods. On the one hand an intimate mixture of $Li_2O_2$ and $NiO$ may be pressed into a pellet, sealed in a vessel and heated to 900° C. as explained by Heikes and Johnson in J. Chem. Phys. 26, 582 (1957). Or nickel may be reacted with a thermally decomposable salt of lithium, such as LiOH or $LiNO_3$ by: (a) impregnating a sintered nickel electrode with a solution of the salt and firing to 800° C. as explained by Ludwig in the Am. Rocket Soc. Symposium on Fuel Cells, 1959; or (b) impregnating nickel particles, firing, pressing and sintering the lithiated particles into a porous electrode body as explained by Gorin in a recent patent. Reinforcement of the lithiated nickel may be advisable.

The number of procedures by which the anode, cathode and electrolyte may be fabricated into a conductive assembly is manifold. A couple of examples will be offered for illustrative purposes only. The electrolyte material may be melted and poured into a mold. Once the electrolyte has developed sufficient mechanical strength to be handled, the anode wires, mesh, rods, or bars may be pressed into one face of the electrolyte material with heat and pressure. According to another method, a layer of oxide electrolyte may be rolled, pressed, painted, sintered or flame-sprayed onto one surface of the completed anode. Arc plasma and vapor deposition techniques may also be employed. The cathode material is applied next in powder form. Then the cathode and electrolyte layers are pressed into intimate association with each other and with the anode by squeezing the entire assembly in a press. The above-described methods emphasize pressing as a means of forcing the cell components into a sufficiently conductive degree of contact with one another. This is not intended, however, to foster the impression that the cell can never be properly fabricated without a pressing operation, since mere contact between the anode, electrolyte and cathode, if it is good contact, is sufficient.

The emitter has been described in general terms, because its exact chemical constituency is no part of the present invention and the knowledge of how to make an emitter of the character described is well within the skill of one conversant with the art. The usual material is porcelain. However, it can be another ceramic material besides porcelain, a mixture of ceramic and metallic material, or even pure metal. The exact compositions of the various porcelains and "cer-mets" as the mixtures of metals and ceramics are sometimes called would be difficult to give and not particularly significant, since the emissive properties of porcelain and other ceramics depend more upon the amount and nature of impurities found therein, on the particle size, and on history of the clay slip during its preparation, molding and firing, rather than on the exact composition. Therefore, those wishing to utilize the present invention who may need further information as to how to make an emitter of the character described are referred to the art relating to the familiar, so-called "radiant" type gas heaters.

The preferred embodiment of the invention and the last-described embodiment are both intended to operate in a temperature range of 700° C. to 1000° C. The necessary heat to maintain the desired temperature in the cell may be derived as an incidental benefit from the heating means for the emitter. However, the invention can be used at other temperatures. The second embodiment, for instance, is intended to operate in space where the temperature developed within the cell will be subject to wide variations. It is clear therefore that the inventive concepts disclosed herein are not circumscribed by unnecessary temperature restrictions. The various temperatures and temperature ranges dealt with in the specification are given by way of example only.

In the broad characterization of the invention preceding the specific embodiments, a list of useful alternate types of electrolytes was given. While only one of the enumerated alternative electrolyte classes, conductive oxides, was included in the specific embodiments presented, this is not to be construed as an impeled abandonment or rejection of the other classes of electrolytes.

Having described my invention, what I wish to claim by United States Letters Patent is:

1. Apparatus for producing electric current comprising:
    an electric cell having an oxygen cathode, an electrolyte adapted to transfer oxide ions and a fenestrate anode which has thereon a material selected from the group consisting of lower forms of photoreducible metal oxides, photo-reducible metal oxides and mixtures of said oxides and lower forms thereof, said material contacting said electrolyte to provide an anode-electrolyte interface;
    a gas tight housing for said cell, said housing including an anode chamber and a cathode chamber and having light transmitting means in one wall of said anode chamber for passing light energy to said interface from a source of light exterior of said anode chamber; and
    means for introducing oxygen-containing gas to the cathode chamber.

2. An energy conversion process, comprising:
    (a) generating electric current in a cell having an oxygen cathode, an electrolyte adapted to transfer oxide ions and an anode having an interface with said electrolyte, by oxidizing a lower form of a photoreducible metal oxide on the surface of said anode to the photoreducible oxide; and
    (b) regenerating the cell while in use by photochemically reducing in situ the photoreducible oxide formed on the anode as a consequence of the oxidative current generating reaction.

3. A photoregenerative cell, comprising:
    an oxygen cathode exposed to a source of oxygen;
    an electrolyte capable of transferring oxide ions in contact with said cathode;
    an anode in contact with said electrolyte, providing an anode-electrolyte interface, said anode having thereon a material selected from the group consisting of lower forms of photoreducible metal oxides, the photoreducible metal oxides themselves, and mixtures of said oxides and the lower forms thereof; and
    means for irradiating said anode-electrolyte interface in said cell whereby the irradiation of said anode causes reduction of said photoreducible oxide with consequent liberation of oxygen and generation of current.

4. A photoregenerative cell in accordance with claim 3 wherein the anode is a fenestrate anode for passing light energy to said interface.

5. A photoregenerative cell in accordance with claim 3 wherein said cell is provided with a gas-tight housing including separate anode and cathode chambers for said anode and cathode and having light-transmitting means in one wall of said anode chamber.

6. A photoregenerative cell in accordance with claim 3 wherein means are provided for recycling oxygen from said anode to said cathode chamber.

7. A photoregenerative cell in accordance with claim 3 wherein the anode comprises an open wire mesh.

8. A photoregenerative cell in accordance with claim 3 wherein said anode is an open wire mesh, said electrolyte is selected from the group consisting of solids, liquids absorbed upon perforate solid matrices and gelled liquids, and said electrolyte contacts said wire mesh on one side thereof and in the lateral spaces between the wires constituting the mesh, but does not cover the other side of said mesh.

9. In a cell comprising a cathode connected with a source of gas comprising oxygen, an electrolyte in contact with said cathode, and an anode having on its surface a metallic oxide which is a lower form of a photoreducible metallic oxide, said oxide being in contact with said electrolyte, the improved method of operation which comprises:
    absorbing gaseous oxygen at said cathode and converting said gaseous oxygen to negatively charged oxygen-containing ions;
    transferring the resultant oxygen-containing ions from said cathode to said anode through said electrolyte;
    generating current in said cell by reacting said oxygen-containing ions from said cathode with the lower form of said photoreducible metallic oxide on said anode to produce the photoreducible metal oxide itself and a surplus of electrons;
    photochemically reducing said photoreducible metallic oxide to said lower form thereof by irradiating said photoreducible oxide in said cell with photon energy; and
    carrying on said current generating reaction and said photochemical reduction simultaneously in said cell, whereby said cell may be operated continuously so long as said photon energy irradiation continues and said cathode is well supplied with oxygen.

10. An energy conversion process in accordance with claim 9 wherein the photoreducible metallic oxide is cupric oxide.

11. An energy conversion process in accordance with claim 9 wherein the photoreducible metallic oxide is cobaltic oxide.

12. An energy conversion process in accordance with claim 9 wherein the photoreducible metallic oxide is plumbic oxide.

13. An energy conversion process in accordance with claim 9 wherein the photoreducible metallic oxide is manganic oxide.

14. An energy conversion process in accordance with claim 9 wherein the photoreducible metallic oxide is ferric oxide.

References Cited

UNITED STATES PATENTS

| 3,031,518 | 4/1962 | Werner et al. | |
| 2,049,472 | 8/1936 | Rosett | 136—89.2 |
| 2,888,007 | 5/1959 | Tabor | 136—89.51 |
| 3,100,163 | 8/1963 | Lyons | 136—86 |

FOREIGN PATENTS

| 229,305 | 7/1960 | Australia. |
| 881,184 | 11/1961 | Great Britain. |
| 8,906 | 5/1897 | Great Britain. |

OTHER REFERENCES

Case: Trans. Am. Electrochemical Soc. 31 (1917) pp. 351–364.

WINSTON A. DOUGLAS, *Primary Examiner.*

H. FEELEY, *Assistant Examiner.*